United States Patent
Baron et al.

(10) Patent No.: US 10,167,222 B2
(45) Date of Patent: Jan. 1, 2019

(54) SELENIUM-FREE SUNGLASS MATERIAL WITH BROWN TINT

(71) Applicant: Corning Incorporated, Corning, NY (US)

(72) Inventors: Pierre-Jean Baron, Bois le Roi (FR); Yves Andre Henri Brocheton, Samoreau (FR)

(73) Assignee: Corning Incorporated, Corning, NY (US)

( * ) Notice: Subject to any disclaimer, the term of this patent is extended or adjusted under 35 U.S.C. 154(b) by 22 days.

(21) Appl. No.: 15/247,319

(22) Filed: Aug. 25, 2016

(65) Prior Publication Data

US 2017/0088455 A1    Mar. 30, 2017

Related U.S. Application Data

(60) Provisional application No. 62/222,958, filed on Sep. 24, 2015.

(51) Int. Cl.

| | | |
|---|---|---|
| C03C 3/089 | (2006.01) | |
| C03C 4/08 | (2006.01) | |
| C03C 21/00 | (2006.01) | |
| C03C 3/11 | (2006.01) | |
| C03C 4/02 | (2006.01) | |
| C03C 4/18 | (2006.01) | |
| G02C 7/10 | (2006.01) | |
| C03C 3/091 | (2006.01) | |
| C03C 3/093 | (2006.01) | |

(52) U.S. Cl.
CPC .............. *C03C 3/089* (2013.01); *C03C 3/091* (2013.01); *C03C 3/093* (2013.01); *C03C 3/11* (2013.01); *C03C 4/02* (2013.01); *C03C 4/082* (2013.01); *C03C 4/085* (2013.01); *C03C 4/18* (2013.01); *C03C 21/002* (2013.01); *C03C 21/005* (2013.01); *G02C 7/10* (2013.01); *C03C 2204/00* (2013.01)

(58) Field of Classification Search
CPC .. C03C 3/089; C03C 3/11; C03C 4/02; C03C 4/082; C03C 4/085; C03C 4/18; C03C 21/005
See application file for complete search history.

(56) References Cited

U.S. PATENT DOCUMENTS

| | | | |
|---|---|---|---|
| 2,075,446 A | 3/1937 | Leibig | |
| 5,256,607 A * | 10/1993 | Kerko | ....................... C03C 1/10 501/65 |
| 5,362,689 A | 11/1994 | Morimoto | |
| 5,403,789 A | 4/1995 | Kerko | |
| 5,405,811 A | 4/1995 | Kerko | |
| 5,422,755 A | 6/1995 | Morgan | |
| 5,438,024 A | 8/1995 | Bolton | |
| 5,446,007 A | 8/1995 | Krashkevich | |
| 5,656,560 A * | 8/1997 | Stotzel | .................... C03C 3/087 501/70 |
| 6,255,238 B1 | 7/2001 | Brocheton | |
| 2014/0356604 A1* | 12/2014 | Borrelli | ................. C03C 21/005 428/216 |

FOREIGN PATENT DOCUMENTS

| | | |
|---|---|---|
| CN | 101643319 A | 2/2010 |
| CN | 101643319 B | 6/2011 |
| EP | 0091247 | 10/1983 |
| EP | 0599116 | 6/1994 |
| EP | 669290 A1 | 8/1995 |
| WO | 2013063207 | 5/2013 |

OTHER PUBLICATIONS

International Search Report and Written Opinion of the International Searching Authority; PCT/US2016/052991; dated Nov. 8, 2016; 12 Pages; European Patent Office.

* cited by examiner

*Primary Examiner* — Elizabeth A. Bolden
(74) *Attorney, Agent, or Firm* — Kevin L. Bray

(57) ABSTRACT

UV- and IR-absorbing materials with brown tint for sunglasses are described. The sunglass materials are prepared from a base glass through a post-fabrication process that includes ion exchange with silver. The tint of the sunglass material can be adjusted by controlling the level of ion exchange of the base glass with silver by varying the conditions of ion exchange. A wide range of tint is possible, including multiple shades of brown tint. In a typical process, a base glass having strong absorption in the UV and IR is fabricated and the resulting glass is subjected to a post-fabrication silver ion exchange process to control tint. The post-fabrication silver ion exchange process permits control of tint while maintaining strong UV and IR absorption and adequate transmittance in the visible.

21 Claims, 2 Drawing Sheets

SELENIUM-FREE SUNGLASS MATERIAL WITH BROWN TINT

This application claims the benefit of priority under 35 U.S.C. § 119 of U.S. Provisional Application Ser. No. 62/222,958 filed on Sep. 24, 2015 the content of which is relied upon and incorporated herein by reference in its entirety.

FIELD

This description pertains to materials for sunglasses and methods for making sunglass materials. More particularly, this description pertains to sunglass materials with high absorption in the ultraviolet and infrared with selectable tint as well as methods for making such materials. Most particularly, this description pertains to selenium-free sunglass materials with brown tint and high absorption in the ultraviolet and infrared as well as methods for making such materials.

BACKGROUND

Sunglass materials have traditionally been designed to provide a desired tint and significant advances have been made in the prior art in controlling tint and providing compositions that provide green, grey and brown tints. New applications, however, are placing increasingly stringent demands on the performance of sunglass materials. Of particular recent is the desire for sunglass materials that are capable of filtering ultraviolet (UV) and infrared radiation (IR) with high efficiency. Sunglass materials must, however, provide UV and IR protection while preserving tint and insuring faithful recognition of color to insure compliance with vehicular safety standards that require correct identification of traffic signals by motorists wearing sunglasses.

Tint is normally controlled by adding one or more colorants to a base glass composition. The base glass composition is typically a silica or modified silica composition, such as aluminosilicate glass, borosilicate glass, or aluminoborosilicate glass with alkali or alkaline earth modifiers. Common colorants include transition metal oxides and rare earth oxides. The component oxides are batched in appropriate amounts, melted, homogenized and cooled to form a glass composition having a desired tint. UV-absorbing modifiers, such as iron oxide or vanadium oxide, can be included in the composition to improve UV absorption. Iron oxide is also desirable for controlling IR absorption because of the mixed valent nature of Fe. Fe can be present in oxides as the ferric ion ($Fe^{3+}$), the ferrous ion ($Fe^{2+}$), or a combination thereof. The ferric ion provides efficient UV absorption and the ferrous ion provides efficient IR absorption. By properly balancing the relative amounts of ferric ion and ferrous ion in the glass composition, a composition having advantageous absorption in both the UV and IR can be achieved The drawback in using iron oxide to achieve a glass composition that efficiently filters UV and IR radiation is that iron oxide also influences transmission in the visible. A typical iron-containing commercial glass composition that absorbs efficiently in the UV and IR has a visible transmittance of about 30%. While 30% visible transmittance is acceptable for many applications of sunglasses, it is too low to permit modification of tint through inclusion of colorants that absorb in the visible. Additional colorants further reduce the visible transmittance of the sunglass material to a level that makes the sunglasses unacceptable for many applications. The multivalent nature of the transition metal and rare earth ions of many oxide colorants also influences the equilibrium balance between ferric and ferrous ions needed to achieve the desired strength of UV and IR absorption.

Due to the lack of flexibility in adding colorants, the range of tints available for sunglasses with efficient filtering of both UV and IR wavelengths is limited. Most notably, it is difficult to obtain sunglasses with a brown tint and adequate visible transmittance that absorb strongly in the UV and IR. U.S. Pat. No. 6,255,238 describes one approach for obtaining brown tint while maintaining strong absorption in the UV and IR. The approach relies on using selenium oxide ($SeO_2$) as a colorant to obtain brown coloration in sunglass materials that exhibit strong UV and IR absorption and adequate visible transmittance.

From a processing standpoint, however, use of $SeO_2$ in glass fabrication is problematic because it has high volatility at the batch melt temperatures required for typical compositions. The high volatility makes it difficult to control the concentration and uniformity of the $SeO_2$ content of the glasses. There is accordingly a need to develop sunglass materials having a brown tint along with satisfactory transmittance in the visible and satisfactory absorption in the UV and IR.

SUMMARY

UV- and IR-absorbing materials with brown tint for sunglasses are described. The materials have excellent absorption in the UV and IR and provide sufficient transmittance in the visible for most applications. The sunglass materials are prepared from a base glass through a post-fabrication process that includes ion exchange with silver. The tint of the sunglass material can be adjusted by controlling the level of ion exchange with silver by varying the conditions of ion exchange. A wide range of tint is possible by controlling the amount of silver exchanged into the glass. Various shades of brown tint, in particular, are achievable through silver ion exchange of pre-fabricated base glasses that exhibit strong absorption in the UV and IR. The post-fabrication ion exchange process permits control of tint without compromising UV and IR absorption while maintaining adequate transmittance in the visible.

The present disclosure extends to:

A glass comprising $B_2O_3$ and $SiO_2$, said glass lacking Se and having (i) a tint with a chromaticity coordinate x in the range from 0.37-0.65, and (ii) an average percent transmittance (% T) over the wavelength range from 780 nm-2000 nm, for a thickness of 1.9 mm, of less than 3%.

The present disclosure extends to:

A method for processing a glass comprising:

placing a first glass in an ion-exchange bath, said first glass comprising $B_2O_3$ and $SiO_2$, said first glass lacking Se, said ion-exchange bath comprising a silver salt and introducing silver into said first glass to form a second glass.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present description, and together with the specification serve to explain principles and operation of methods, products, and compositions embraced by the present description. Features shown in the drawing are illustrative of selected embodiments of the present description and are not necessarily depicted in proper scale.

BRIEF DESCRIPTION OF THE DRAWINGS

While the specification concludes with claims particularly pointing out and distinctly claiming the subject matter of the written description, it is believed that the specification will be better understood from the following written description when taken in conjunction with the accompanying drawings, wherein:

The embodiments set forth in the drawings are illustrative in nature and not intended to be limiting of the scope of the detailed description or claims. Whenever possible, the same reference numeral will be used throughout the drawings to refer to the same or like feature.

DETAILED DESCRIPTION

Figure 1:
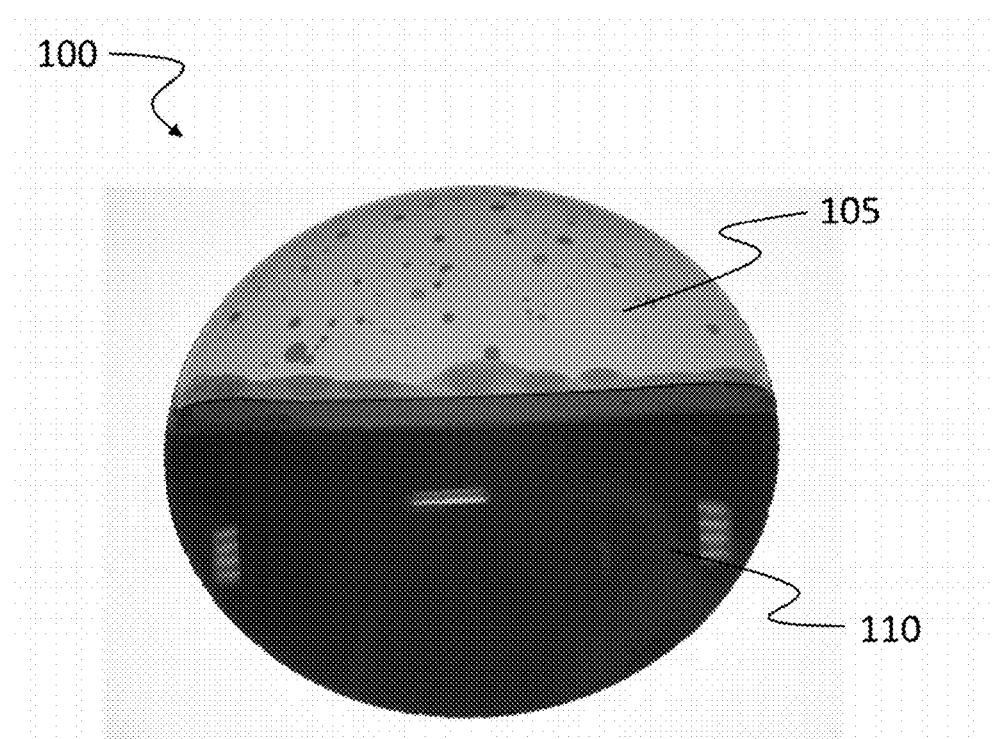
FIG. 1 illustrates a borosilicate base glass having an untreated upper portion and a lower portion treated with an ion-exchange process.

Reference will now be made in detail to illustrative embodiments of the present description. It is to be understood that the terminology used herein is for the purpose of describing particular aspects only and is not intended to be limiting.

The following terminology will be used herein:

Chromaticity coordinate refers to a coordinate on the CIE 1931 chromaticity diagram developed by the International Commission on Illumination. Color (tint) will be described herein in terms of the x and y chromaticity coordinates that are well known in the art.

The present description provides glasses suitable for use as sunglass materials. The glasses feature strong absorption in the ultraviolet (UV) and infrared (IR) as well as a tint described by coordinates in the brown portion of the CIE 1931 chromaticity diagram. The glasses are made by subjecting a base glass to a post-fabrication ion exchange process. The ion exchange process permits incorporation of silver in the base glass and the tint of the glass treated by ion exchange can be controlled by controlling the concentration of silver incorporated into the glass. The silver ion exchange process permits control of tint without significantly altering the UV absorption and IR absorption of the base glass. As a result, when a base glass having strong absorption over desired wavelength ranges in the UV and IR is treated by a silver ion-exchange process, various tints can be achieved without compromising performance in the UV and IR.

The base glass compositions are multicomponent borosilicate glasses that include silica ($SiO_2$), boron oxide ($B_2O_3$) and one or more oxide modifiers. The silica content is in the range from 62 wt % to 71 wt % and the boron oxide content is in the range from 2 wt % to 8 wt %. The balance of the borosilicate matrix glass composition is oxide modifiers and optional halogens.

Oxide modifiers for the borosilicate base glass include one or more of $Al_2O_3$, $ZrO_2$, $Li_2O$, $Na_2O$, $K_2O$, $CaO$, $ZnO$, $TiO_2$, $Fe_2O_3$, $Co_3O_4$, $NiO$, $As_2O_3$, $Sb_2O_3$, and $SnO_2$. Halogens that are optionally present in the borosilicate base glass include one or more of Cl, Br, and F.

Representative compositions for the borosilicate base glass are given in Table 1. Amounts of each component are listed. The amounts listed are in units of wt % (weight percent).

TABLE 1

| Component | Amount (wt %) |
|---|---|
| $SiO_2$ | 62-71% |
| $B_2O_3$ | 2-8% |
| $Al_2O_3$ | 0-4% |
| $ZrO_2$ | 0-2% |
| $Li_2O$ | 0-4% |
| $Na_2O$ | 6-10% |
| $K_2O$ | 7-16% |
| $CaO$ | 0-5.5% |
| $ZnO$ | 0-7% |
| $TiO_2$ | 0-2% |
| $Fe_2O_3$ | 2-9% |
| $FeO$ | 0-3% |
| $Co_3O_4$ | 0-0.030% |
| $NiO$ | 0-0.2% |
| $As_2O_3$ | 0-0.1% |
| $Sb_2O_3$ | 0-0.1% |
| $SnO_2$ | 0-0.1% |
| Cl | 0-2% |
| Br | 0-2% |
| F | 0-2% | where the amounts of each component may be considered independently of each other or collectively in combinations of two or more with each other.

Table 2 shows one example of a representative base glass composition selected from Table 1.

TABLE 2

| Component | Amount (wt %) |
|---|---|
| $SiO_2$ | 66-69% |
| $B_2O_3$ | 3-5% |
| $Na_2O$ | 7-9% |
| $K_2O$ | 9-14% |
| $CaO$ | 0.5-2% |
| $Fe_2O_3$ | 4-8% |
| $Co_3O_4$ | 0-0.020 |
| $NiO$ | 0-0.16% |
| Br | 0.5-1.5 |

The modifiers included in the borosilicate base glass are selected to provide various advantages and can be customized to suit the needs of specific applications. Alkali metal oxides aid processability of the melt by reducing the viscosity of the glass. The alkali ions of the alkali metal oxides also participate in the ion exchange described in further detail hereinbelow. $Al_2O_3$ improves chemical durability. $TiO_2$, $ZrO_2$, and $ZnO$, independently or in combination, influence the refractive index of the glass and can be used to control or fine tune refractive index. $Co_3O_4$ and $NiO$ are added to influence transmittance in the visible and facilitate compliance of the glass with regulatory standards related to traffic signal recognition.

$Fe_2O_3$ and/or $FeO$ are included to control the UV and IR absorption of the borosilicate base glass. Fe is a multivalent element and is present as ferric ion ($Fe^{3+}$) and ferrous ion ($Fe^{2+}$) in the borosilicate base glass. The ferric ion provides UV absorption and the ferrous ion provides IR absorption. The proportions of ferric ion and ferrous ion are controlled to provide the desired balance between absorption in the UV and absorption in the IR. The proportions of ferric ion and ferrous ion can be controlled in several ways, including (1) controlling the redox conditions of the glass during fabrication (e.g. by controlling the partial pressure of $O_2$ present in the heating environment); (2) incorporating a reducing agent (e.g. $Sb_2O_3$, SnO, $SnO_2$, and $As_2O_3$) in the compositions; and (3) varying the total concentration of iron in the glass. By establishing a proper equilibrium between the concentrations of ferric ion and ferrous ion, glasses having high absorption efficiency in both the UV and IR are achievable.

As is known in the art, however, use of iron to control UV and IR absorption leads to glasses having a green tint. The customary approach to controlling tint in glass is to include colorants in the composition. Colorants for brown tint include oxides of one or more of Mn, V, and Ce. Although such oxides impart brown color to glass, Mn, V, and Ce are multivalent ions and can adopt multiple oxidation states in the glass. As a result, the presence of multivalent ions in the glass influences the redox state of the glass and can alter the equilibrium balance between ferric ion and ferrous ion needed to simultaneously achieve strong absorption in the UV and IR. When several multivalent ions are present in the glass composition, it is difficult to adjust processing conditions to establish a redox state that simultaneously optimizes the oxidation states of iron and the coloring oxides.

In addition to being reducing agents, compounds such as $Sb_2O_3$, SnO, $SnO_2$, and $As_2O_3$ are fining agents that act to minimize gas phase inclusions in the glass during finishing. The multivalent nature of compounds, however, can influence the redox state of the glass and the equilibrium proportions of ferric ion and ferrous ions during the finishing process. To avoid unintended disturbance of the equilibrium between ferric ion and ferrous ion during finishing, it may be desirable to exclude reducing agents from the glass composition and to use halogens as fining agents. Halogens can also be used in combination with one or more reducing agents to permit a reduction in the concentration of reducing agent to the minimum level needed to control or establish the equilibrium between ferric ion and ferrous ion without regard to functionality as a fining agent. Inclusion of one or more halogens provides fining functionality. The exemplary borosilicate base glass composition shown in Table 2, for example, excludes $Sb_2O_3$, SnO, $SnO_2$, and $As_2O_3$, and includes Br is a fining agent.

The post-fabrication ion-exchange process described herein permits adjustment of the tint of the borosilicate base glass to brown without appreciably disturbing the equilibrium between ferric ion and ferrous ion established during fabrication of the borosilicate base glass. The glasses produced by the post-fabrication ion-exchange process have a brown tint and are free of Se. Brown tint in glasses with strong UV and IR absorption is accordingly achievable without the difficulties and uncertainties associated with incorporating volatile selenium oxides in the melt composition. Better and more predictable control of the tint of the product glass results.

In the ion-exchange process, the borosilicate base glass is exposed to a bath containing silver ions to introduce silver ions into the composition. The silver ions are exchanged for alkali metal ions and enter the base glass to form an ion-exchanged glass. The borosilicate base glass after treatment by the ion-exchange process may be referred to herein as an ion-exchanged glass. Coloration of the ion-exchanged glass occurs through precipitation of silver ions to form metallic particles. The metallic particles are nanoparticles of neutral silver atoms that have an average diameter or cross-sectional dimension in the range from 1 nm-400 nm, or 1.5 nm-300 nm, or 2 nm-200 nm, or 5 nm-100 nm. The size and concentration of silver nanoparticles control the coloration. The mechanism of coloration includes scattering of light from the silver nanoparticles.

The ion-exchange bath includes a silver salt and one or more alkali metal ion salts. The concentration of silver salt in the bath may be at least 0.005 wt %, or at least 0.010 wt %, or at least 0.025 wt %, or at least 0.050 wt %, or at least 0.10 wt %, or at least 0.25 wt %, or at least 0.50 wt %, or at least 0.75 wt %, or in the range from 0.005 wt % to 3.0 wt %, or in the range from 0.010 wt % to 2.0 wt %, or in the range from 0.005 wt % to 0.50 wt %, or in the range from 0.010 wt % to 0.75 wt %, or in the range from 0.010 wt % to 1.0 wt %, or in the range from 0.015 wt % to 0.75 wt %, or in the range from 0.015 wt % to 0.50 wt %, or in the range from 0.05 wt % to 1.0 wt %, or in the range from 0.10 wt % to 1.0 wt %, or in the range from 0.05 wt % to 0.50 wt %. In one embodiment, the bath includes silver nitrate ($AgNO_3$) as a source of silver ions and one or more alkali metal nitrates. In a second embodiment, the bath includes silver nitrate ($AgNO_3$) as a source of silver ions and $NaNO_3$. In a third embodiment, the bath includes silver nitrate ($AgNO_3$) as a source of silver ions and $KNO_3$. In a fourth embodiment, the bath includes silver nitrate ($AgNO_3$) as a source of silver ions, $NaNO_3$, and $KNO_3$. The ion-exchange bath may optionally include silicic acid in an amount up to 1.0 wt %, such as an amount in the range from 0.01 wt %-1.0 wt %. Salts other than nitrates may be used for silver and the alkali metals present in the ion-exchange bath. Other salts include halides, sulfates, and carbonates. Nitrates are convenient because the molten state is achievable with relatively mild process conditions. In one exemplary embodiment, the ion-exchange bath includes 0.1 wt % $AgNO_3$, 99.4 wt % $KNO_3$, and 0.5 wt % silicic acid. In a second exemplary composition, the ion-exchange bath includes 0.1 wt % $AgNO_3$, 40.0 wt % $NaNO_3$, 59.4 wt % $KNO_3$, and 0.5 wt % silicic acid.

The silver concentration exchanged into the base glass by the bath can be controlled by varying the temperature of the bath and the time of exposure of the base glass to the bath. The temperature of the bath may be at least 300° C., or at least 350° C., or at least 400° C., or at least 450° C., or in the range from 300° C. to 500° C., or in the range from 325° C. to 475° C., or in the range from 350° C. to 450° C. The time of exposure of the base glass to the bath may be at least 30 sec, or at least 1 min, or at least 3 min, or at least 5 min, or at least 10 min, or at least 20 min, or at least 30 min, or at least 40 min, or at least 60 min, or at least 90 min, or at least 120 min, or in the range from 1 min to 300 min, or in the range from 3 min to 270 min, or in the range from 1 min to 240 min, or in the range from 5 min to 180 min, or in the range from 10 min to 90 min, or in the range from 10 min to 60 min, or in the range from 15 min to 180 min, or in the range from 15 min to 120 min, or in the range from 15 min to 90 min.

The concentration profile of silver in the glass after the post-fabrication ion-exchange process is non-uniform. The concentration of silver is highest at the surface and continuously decreases in the bulk of the glass with increasing distance from the surface. The portion of the glass that contains silver is an ion-exchange layer extending from the surface. The ion-exchange layer has a thickness on the order of microns or tens of microns, where the thickness of the ion-exchange layer corresponds to depth from the surface at which the concentration of silver decreases to below the detection threshold. The thickness of the ion-exchange layer and distribution of silver ions within the ion-exchange layer can be controlled by varying the concentration of silver salt in the ion-exchange bath, the temperature of the ion-exchange bath, and the time of exposure of the base glass to the ion-exchange bath.

The concentration of silver in the ion-exchange layer is measured by depth profiling techniques known in the art. When measured by depth profiling, the concentration of silver may be expressed in units of wt % of silver oxide ($Ag_2O$). Although the conventional unit of reporting in the depth profiling technique is wt % $Ag_2O$, it is understood that the silver in the ion-exchange layer is in the form of silver nanoparticles. The wt % Ag can be obtained from the wt % $Ag_2O$ obtained from the depth profiling measurement by multiplying by the ratio of twice the molecular weight of Ag to the molecular weight of $Ag_2O$ (e.g. 2(107.87 g/mol)/(231.74 g/mol)=0.931 or 93.1%).

Since depth profiling was used as the technique for determining the concentration of silver in the ion-exchange layer and since the quantity derived from the depth layer technique is wt % $Ag_2O$, the following description of the concentration of silver in the ion-exchange layer is based on the concentration of silver oxide, where it is understood that silver oxide refers to $Ag_2O$ and where the silver oxide concentration can be converted to Ag concentration by multiplying by 0.931 as described above to obtain corresponding ranges for the concentration of Ag in the ion-exchange layer.

The concentration of silver oxide at the surface of the glass may be at least 1.0 wt %, or at least 2.0 wt %, or at least 4.0 wt %, or at least 5.0 wt %, or at least 7.5 wt %, or at least 10 wt %, or in the range from 0.5 wt % to 15.0 wt %, or in the range from 1.0 wt % to 12.5 wt %, or in the range from 2.0 wt % to 12.5 wt %, or in the range from 4.0 wt % to 10.0 wt %, or in the range from 5.0 wt % to 10.0 wt %.

The concentration of silver oxide at a depth of 1 μm from the surface of the ion-exchange layer is less than the concentration of silver oxide at the surface of the ion-exchange layer. The concentration of silver oxide at a depth of 1 μm from the surface of the ion-exchange layer may be at least 10% of the concentration of silver oxide at the surface of the ion-exchange layer, or at least 20% of the concentration of silver oxide at the surface of the ion-exchange layer, or at least 30% of the concentration of silver oxide at the surface of the ion-exchange layer, or at least 40% of the concentration of silver oxide at the surface of the ion-exchange layer, or at least 50% of the concentration of silver oxide at the surface of the ion-exchange layer, or in the range from 10% to 90% of the concentration of silver oxide at the surface of the ion-exchange layer, or in the range from 20% to 85% of the concentration of silver oxide at the surface of the ion-exchange layer, or in the range from 30% to 80% of the concentration of silver oxide at the surface of the ion-exchange layer, or in the range from 40% to 75% of the concentration of silver oxide at the surface of the ion-exchange layer.

The concentration of silver oxide at a depth of 2 μm from the surface of the ion-exchange layer is less than the concentration of silver oxide at a depth of 1 μm from the surface of the ion-exchange layer. The concentration of silver oxide at a depth of 2 μm from the surface of the ion-exchange layer may be at least 10% of the concentration of silver oxide at the surface of the ion-exchange layer, or at least 20% of the concentration of silver oxide at the surface of the ion-exchange layer, or at least 30% of the concentration of silver oxide at the surface of the ion-exchange layer, or at least 40% of the concentration of silver oxide at the surface of the ion-exchange layer, or at least 50% of the concentration of silver oxide at the surface of the ion-exchange layer, or in the range from 10% to 90% of the concentration of silver oxide at the surface of the ion-exchange layer, or in the range from 20% to 85% of the concentration of silver oxide at the surface of the ion-exchange layer, or in the range from 30% to 80% of the concentration of silver oxide at the surface of the ion-exchange layer, or in the range from 40% to 75% of the concentration of silver oxide at the surface of the ion-exchange layer.

The concentration of silver oxide at a depth of 3 μm from the surface of the ion-exchange layer is less than the concentration of silver oxide at a depth of 2 μm from the surface of the ion-exchange layer. The concentration of silver oxide at a depth of 3 μm from the surface of the ion-exchange layer may be at least 5% of the concentration of silver oxide at the surface of the ion-exchange layer, or at least 10% of the concentration of silver oxide at the surface of the ion-exchange layer, or at least 20% of the concentration of silver oxide at the surface of the ion-exchange layer, or at least 30% of the concentration of silver oxide at the surface of the ion-exchange layer, or at least 40% of the concentration of silver oxide at the surface of the ion-exchange layer, or in the range from 5% to 90% of the concentration of silver oxide at the surface of the ion-exchange layer, or in the range from 10% to 85% of the concentration of silver oxide at the surface of the ion-exchange layer, or in the range from 15% to 80% of the concentration of silver oxide at the surface of the ion-exchange layer, or in the range from 20% to 75% of the concentration of silver oxide at the surface of the ion-exchange layer.

The concentration of silver oxide at a depth of 5 μm from the surface of the ion-exchange layer is less than the concentration of silver oxide at a depth of 3 μm from the surface of the ion-exchange layer. The concentration of silver oxide at a depth of 5 μm from the surface of the ion-exchange layer may be at least 5% of the concentration of silver oxide at the surface of the ion-exchange layer, or at least 10% of the concentration of silver oxide at the surface of the ion-exchange layer, or at least 20% of the concentration of silver oxide at the surface of the ion-exchange layer, or at least 30% of the concentration of silver oxide at the surface of the ion-exchange layer, or at least 40% of the concentration of silver oxide at the surface of the ion-exchange layer, or in the range from 5% to 90% of the concentration of silver oxide at the surface of the ion-exchange layer, or in the range from 10% to 85% of the concentration of silver oxide at the surface of the ion-exchange layer, or in the range from 15% to 80% of the concentration of silver oxide at the surface of the ion-exchange layer, or in the range from 20% to 75% of the concentration of silver oxide at the surface of the ion-exchange layer.

The concentration of silver oxide at a depth of 10 μm from the surface of the ion-exchange layer is less than the concentration of silver oxide at a depth of 5 μm from the surface of the ion-exchange layer. The concentration of silver oxide at a depth of 10 μm from the surface of the ion-exchange layer may be at least 5% of the concentration of silver oxide at the surface of the ion-exchange layer, or at least 10% of the concentration of silver oxide at the surface of the ion-exchange layer, or at least 20% of the concentration of silver oxide at the surface of the ion-exchange layer, or at least 30% of the concentration of silver oxide at the surface of the ion-exchange layer, or at least 40% of the concentration of silver oxide at the surface of the ion-exchange layer, or in the range from 5% to 90% of the concentration of silver oxide at the surface of the ion-exchange layer, or in the range from 10% to 85% of the concentration of silver oxide at the surface of the ion-exchange layer, or in the range from 15% to 80% of the concentration of silver oxide at the surface of the ion-exchange layer, or in the range from 20% to 75% of the concentration of silver oxide at the surface of the ion-exchange layer.

The concentration of silver oxide at a depth of 15 µm from the surface of the ion-exchange layer is less than the concentration of silver oxide at a depth of 10 µm from the surface of the ion-exchange layer. The concentration of silver oxide at a depth of 15 µm from the surface of the ion-exchange layer may be at least 5% of the concentration of silver oxide at the surface of the ion-exchange layer, or at least 10% of the concentration of silver oxide at the surface of the ion-exchange layer, or at least 20% of the concentration of silver oxide at the surface of the ion-exchange layer, or at least 30% of the concentration of silver oxide at the surface of the ion-exchange layer, or at least 40% of the concentration of silver oxide at the surface of the ion-exchange layer, or in the range from 5% to 90% of the concentration of silver oxide at the surface of the ion-exchange layer, or in the range from 10% to 85% of the concentration of silver oxide at the surface of the ion-exchange layer, or in the range from 15% to 80% of the concentration of silver oxide at the surface of the ion-exchange layer, or in the range from 20% to 75% of the concentration of silver oxide at the surface of the ion-exchange layer.

The silver ion-exchange process affords control over the tint of the glass without compromising the UV and IR absorption of the base borosilicate glass. Absorption can be expressed in terms of percent transmittance (% T) at a particular wavelength or over a particular wavelength range. When expressed in terms of a wavelength range, % T refers to an average over the range. Unless otherwise stated, % T refers to the percent transmittance through a sample having a thickness of 1.9 mm. % T per mm thickness can be obtained by dividing % T for a sample having thickness 1.9 mm by the thickness 1.9 mm. Percent transmittance in the UV range may be reported herein as the % T over the wavelength range from 280 nm-400 nm and the percent transmittance in the IR range may be reported herein as the % T over the wavelength range from 780 nm-2000 nm. Transmittance in the IR range may also be reported herein as % T at 1100 nm.

In the discussion that follows, the transmittance of the ion-exchanged glass and corresponding borosilicate base glass in the UV and IR spectra regions are described. % T over the wavelength ranges from 280 nm-400 nm and 780 nm-2000 nm are described. Although % T over the wavelength ranges from 280 nm-400 nm and 780 nm-2000 nm are described separately, it is understood that the ion-exchanged glass and corresponding borosilicate base glass may simultaneously exhibit any of the % T performance specifications stated for the 280 nm-400 nm wavelength range and any of the % T performance specifications for the 780 nm-2000 nm wavelength range.

The base borosilicate glass with thickness 1.9 mm may have an average percent transmittance (% T) over the wavelength range from 280 nm-400 nm of less than 1%, or less than 0.75%, or less than 0.5%, or less than 0.25%, or in the range from 0.01%-2%, or in the range from 0.05% to 1%, or in the range from 0.10% to 0.75%, or in the range from 0.15% to 0.60%, or in the range from 0.20% to 0.50%.

After post-fabrication treatment by the ion-exchange process, the ion-exchanged glass with thickness 1.9 mm may have an average percent transmittance (% T) over the wavelength range from 280 nm-400 nm of less than 1%, or less than 0.75%, or less than 0.5%, or less than 0.25%, or less than 0.15%, or less than 0.10%, or less than 0.05%, or less than 0.01%, or in the range from 0.001%-2%, or in the range from 0.005% to 1%, or in the range from 0.010% to 0.75%, or in the range from 0.02% to 0.60%, or in the range from 0.05% to 0.50%.

In one embodiment, the ion-exchanged glass has lower average transmittance over the wavelength range from 280 nm-400 nm than the borosilicate base glass. After post-fabrication treatment by the ion-exchange process, the ion-exchanged glass with thickness 1.9 mm may have an average percent transmittance (% T) over the wavelength range from 280 nm-400 nm that is less than the average percent transmittance (% T) of the untreated borosilicate base glass with thickness 1.9 mm over the wavelength range from 280 nm-400 nm.

In another embodiment, the ion-exchanged glass has an average transmittance over the wavelength range from 280 nm-400 nm that differs only slightly from the average transmittance of the borosilicate base glass over the wavelength range from 280 nm-400 nm. After post-fabrication treatment by the ion-exchange process, the ion-exchanged glass with thickness 1.9 mm may have an average percent transmittance (% T) over the wavelength range from 280 nm-400 nm that is less than 150% of the average percent transmittance (% T) of the borosilicate base glass with thickness 1.9 mm over the wavelength range from 280 nm-400 nm. After post-fabrication treatment by the ion-exchange process, the ion-exchanged glass with thickness 1.9 mm may have an average percent transmittance (% T) over the wavelength range from 280 nm-400 nm that is less than 100% of the average percent transmittance (% T) of the borosilicate base glass with thickness 1.9 mm over the wavelength range from 280 nm-400 nm. After post-fabrication treatment by the ion-exchange process, the ion-exchanged glass with thickness 1.9 mm may have an average percent transmittance (% T) over the wavelength range from 280 nm-400 nm that is less than 50% of the average percent transmittance (% T) of the borosilicate base glass with thickness 1.9 mm over the wavelength range from 280 nm-400 nm. After post-fabrication treatment by the ion-exchange process, the ion-exchanged glass with thickness 1.9 mm may have an average percent transmittance (% T) over the wavelength range from 280 nm-400 nm that is less than 25% of the average percent transmittance (% T) of the borosilicate base glass with thickness 1.9 mm over the wavelength range from 280 nm-400 nm. After post-fabrication treatment by the ion-exchange process, the ion-exchanged glass with thickness 1.9 mm may have an average percent transmittance (% T) over the wavelength range from 280 nm-400 nm that is less than 10% of the average percent transmittance (% T) of the borosilicate base glass with thickness 1.9 mm over the wavelength range from 280 nm-400 nm. After post-fabrication treatment by the ion-exchange process, the ion-exchanged glass with thickness 1.9 mm may have an average percent transmittance (% T) over the wavelength range from 280 nm-400 nm that is between 1% and 100% of the average percent transmittance (% T) of the borosilicate base glass with thickness 1.9 mm over the wavelength range from 280 nm-400 nm (e.g. if the borosilicate base glass has average % T=0.40 over the wavelength range from 280 nm-400 nm, the ion-exchanged glass has average % T between 0.04 and 0.40 over the wavelength range from 280 nm-400 nm). After post-fabrication treatment by the ion-exchange process, the ion-exchanged glass with thickness 1.9 mm may have an average percent transmittance (% T) over the wavelength range from 280 nm-400 nm that is between 5% and 50% of the average percent transmittance (% T) of the borosilicate base glass with thickness 1.9 mm over the wavelength range from 280 nm-400 nm (e.g. if the borosilicate base glass has average % T=0.40 over the wavelength range from 280 nm-400 nm, the ion-exchanged glass has average % T between 0.02 and 0.20 over the wavelength range from 280 nm-400 nm).

The base borosilicate glass with thickness 1.9 mm may have an average percent transmittance (% T) over the wavelength range from 780 nm-2000 nm of less than 3.0%, or less than 2.5%, or less than 2.0%, or less than 1.5%, or less than 1.0%, or in the range from 0.5%-5%, or in the range from 0.75% to 4%, or in the range from 1.0% to 3.0%.

After post-fabrication treatment by the ion-exchange process, the ion-exchanged glass with thickness 1.9 mm may have an average percent transmittance (% T) over the wavelength range from 780 nm-2000 nm of less than 3.0%, or less than 2.5%, or less than 2.0%, or less than 1.5%, or less than 1.0%, or in the range from 0.5%-5%, or in the range from 0.75% to 4%, or in the range from 1.0% to 3.0%.

In one embodiment, the ion-exchanged glass has lower average transmittance over the wavelength range from 780 nm-2000 nm than the borosilicate base glass. After post-fabrication treatment by the ion-exchange process, the ion-exchanged glass with thickness 1.9 mm may have an average percent transmittance (% T) over the wavelength range from 780 nm-2000 nm that is less than the average percent transmittance (% T) of the untreated borosilicate base glass with thickness 1.9 mm over the wavelength range from 780 nm-2000 nm.

In another embodiment, the ion-exchanged glass has an average transmittance over the wavelength range from 780 nm-2000 nm that differs only slightly from the average transmittance of the borosilicate base glass over the wavelength range from 780 nm-2000 nm. After post-fabrication treatment by the ion-exchange process, the ion-exchanged glass with thickness 1.9 mm may have an average percent transmittance (% T) over the wavelength range from 780 nm-2000 nm that is less than 200% of the average percent transmittance (% T) of the borosilicate base glass with thickness 1.9 mm over the wavelength range from 780 nm-2000 nm. After post-fabrication treatment by the ion-exchange process, the ion-exchanged glass with thickness 1.9 mm may have an average percent transmittance (% T) over the wavelength range from 780 nm-2000 nm that is less than 150% of the average percent transmittance (% T) of the borosilicate base glass with thickness 1.9 mm over the wavelength range from 780 nm-2000 nm. After post-fabrication treatment by the ion-exchange process, the ion-exchanged glass with thickness 1.9 mm may have an average percent transmittance (% T) over the wavelength range from 780 nm-2000 nm that is less than 125% of the average percent transmittance (% T) of the borosilicate base glass with thickness 1.9 mm over the wavelength range from 780 nm-2000 nm. After post-fabrication treatment by the ion-exchange process, the ion-exchanged glass with thickness 1.9 mm may have an average percent transmittance (% T) over the wavelength range from 780 nm-2000 nm that is less than 100% of the average percent transmittance (% T) of the borosilicate base glass with thickness 1.9 mm over the wavelength range from 780 nm-2000 nm. After post-fabrication treatment by the ion-exchange process, the ion-exchanged glass with thickness 1.9 mm may have an average percent transmittance (% T) over the wavelength range from 780 nm-2000 nm that is between than 50% and 150% of the average percent transmittance (% T) of the borosilicate base glass with thickness 1.9 mm over the wavelength range from 780 nm-2000 nm (e.g. if the borosilicate base glass has average % T=0.6 over the wavelength range from 780 nm-2000 nm, the ion-exchanged glass has average % T between 0.30 and 0.90 over the wavelength range from 780 nm-2000 nm). After post-fabrication treatment by the ion-exchange process, the ion-exchanged glass with thickness 1.9 mm may have an average percent transmittance (% T) over the wavelength range from 780 nm-2000 nm that is between 75% and 125% of the average percent transmittance (% T) of the borosilicate base glass with thickness 1.9 mm over the wavelength range from 780 nm-2000 nm (e.g. if the borosilicate base glass has average % T=0.6 over the wavelength range from 780 nm-2000 nm, the ion-exchanged glass has average % T between 0.45 and 0.75 over the wavelength range from 780 nm-2000 nm).

The borosilicate base glass with thickness 1.9 mm may have a percent transmittance (% T) at 1100 nm less than 5%, or less than 3%, or less than 2%, or less than 1%, or less than 0.75%, or less than 0.5%, or less than 0.30%, or in the range from 0.10%-5%, or in the range from 0.2%-3.0%, or in the range from 0.3%-2.0%, or in the range from 0.4%-1.0%

After post-fabrication treatment by the ion-exchange process, the ion-exchanged glass with thickness 1.9 mm may have a percent transmittance (% T) at 1100 nm less than 5%, or less than 3%, or less than 2%, or less than 1%, or less than 0.75%, or less than 0.5%, or less than 0.30%, or in the range from 0.10%-5%, or in the range from 0.2%-3.0%, or in the range from 0.3%-2.0%, or in the range from 0.4%-1.0%.

In another embodiment, the ion-exchanged glass has a transmittance at 1100 nm that differs only slightly from the transmittance at 1100 nm of the borosilicate base glass. After post-fabrication treatment by the ion-exchange process, the ion-exchanged glass with thickness 1.9 mm may have a percent transmittance (% T) at 1100 nm that is less than 200% of the percent transmittance (% T) at 1100 nm of the borosilicate base glass with thickness 1.9 mm. After post-fabrication treatment by the ion-exchange process, the ion-exchanged glass with thickness 1.9 mm may have a percent transmittance (% T) at 1100 nm that is less than 150% of the percent transmittance (% T) at 1100 nm of the borosilicate base glass with thickness 1.9 mm. After post-fabrication treatment by the ion-exchange process, the ion-exchanged glass with thickness 1.9 mm may have a percent transmittance (% T) at 1100 nm that is less than 125% of the percent transmittance (% T) at 1100 nm of the borosilicate base glass with thickness 1.9 mm.

As indicated hereinabove, various tints are achievable in the ion-exchanged glass based on selection of the composition of the ion-exchange bath and the conditions of the ion-exchange process. The tint may be characterized by chromaticity coordinates x and y based on the CIE 1931 chromaticity diagram. In one embodiment, the ion-exchanged glass has a brown tint. The ion-exchanged glass may have a chromaticity coordinate x in the range from 0.37-0.65, or in the range from 0.38-0.60, or in the range from 0.40-0.62, or in the range from 0.42-0.60, or in the range from 0.43-0.55, or in the range from 0.44-0.52. The ion-exchanged glass may have a chromaticity coordinate y in the range from 0.35-0.54, or in the range from 0.37-0.52, or in the range from 0.40-0.50, or in the range from 0.41-0.48, or in the range from 0.42-0.46. The ion-exchanged glass may have a chromaticity coordinate x in the range from 0.37-0.65 and a chromaticity coordinate y in the range from 0.35-0.54, or a chromaticity coordinate x in the range from 0.42-0.60 and a chromaticity coordinate y in the range from 0.37-0.52, or a chromaticity coordinate x in the range from 0.43-0.55 and a chromaticity coordinate y in the range from 0.40-0.50. In one embodiment, the ion-exchanged glass may have chromaticity coordinates in the CIE 1931 chromaticity diagram contained within a polygon (ABCD) defined by the following four vertex coordinates (expressed as (x, y)): A (0.38, 0.35), B (0.60, 0.41), C (0.60, 0.54), and D (0.38, 0.51).

In another embodiment, the ion-exchanged glass has a brown tint and the borosilicate base glass has a green tint. The ion-exchanged glass may have chromaticity coordinates x and y as described hereinabove, individually or in combination, and the borosilicate base glass may have a chromaticity coordinate x in the range from 0.25-0.40, or in the range from 0.30-0.38, or in the range from 0.32-0.37. The ion-exchanged glass may have chromaticity coordinates x and y as described hereinabove, individually or in combination, and the borosilicate base glass may have a chromaticity coordinate y in the range from 0.30-0.42, or in the range from 0.32-0.41, or in the range from 0.34-0.40. The ion-exchanged glass may have chromaticity coordinates x and y as described hereinabove, individually or in combination, and the borosilicate base glass may have a chromaticity coordinate x in the range from 0.25-0.40 and a chromaticity coordinate y in the range from 0.30-0.42, or a chromaticity coordinate x in the range from 0.30-0.38 and a chromaticity coordinate y in the range from 0.32-0.41, or a chromaticity coordinate x in the range from 0.32-0.37 and a chromaticity coordinate y in the range from 0.34-0.40.

In another embodiment, the ion-exchanged glass has a chromaticity coordinate x that is higher than the chromaticity coordinate x of the borosilicate base glass. The chromaticity coordinate x of the ion-exchanged glass may exceed the chromaticity coordinate x of the borosilicate base glass by at least 0.02, or at least 0.05, or at least 0.10, or at least 0.12, or at least 0.15, or at least 0.20, or by an amount in the range from 0.02-0.25, or an amount in the range from 0.05-0.20, or an amount in the range from 0.10-0.15.

In a further embodiment, the ion-exchanged glass has a chromaticity coordinate y that is higher than the chromaticity coordinate y of the borosilicate base glass. The chromaticity coordinate y of the ion-exchanged glass may exceed the chromaticity coordinate y of the borosilicate base glass by at least 0.01, or at least 0.02, or at least 0.03, or at least 0.04, or at least 0.05, or at least 0.06, or by an amount in the range from 0.01-0.10, or an amount in the range from 0.02-0.08, or an amount in the range from 0.03-0.07.

EXAMPLES

The following examples demonstrate the controlled tinting of a representative borosilicate base glass composition using the silver ion-exchange process. The borosilicate base glass has the composition given in Table 3, has a green tint, and contains no Se. The amounts of each component are expressed in units of wt %.

TABLE 3

| Borosilicate Base Glass Composition | |
| --- | --- |
| Component | Amount (wt %) |
| $SiO_2$ | 63.14 |
| $B_2O_3$ | 3.0 |
| $Al_2O_3$ | 2.7 |
| $Na_2O$ | 10.0 |
| $K_2O$ | 8.4 |
| ZnO | 6.9 |
| $TiO_2$ | 1.0 |
| $Fe_2O_3$ | 2.32 |
| FeO | 1.23 |
| Cl | 0.91 |
| Br | 0.26 |

Selected properties of the borosilicate base glass (thickness=1.9 mm) are given in Table 4.

TABLE 4

| Selected Properties of Borosilicate Base Glass | |
| --- | --- |
| % T (380 nm-780 nm) | 27.6 |
| x | 0.3405 |
| y | 0.3980 |
| % T (280 nm-400 nm) | 0.325 |
| % T (1100 nm) | 0.4 |
| % T (780 nm-2000 nm) | 1.6 |

In a first series of post-fabrication treatments, samples of the borosilicate base glass were treated by an ion-exchange process in which the samples were immersed for in an ion-exchange bath that included 10 wt % $AgNO_3$, 89.5 wt % $KNO_3$, and 0.5 wt % silicic acid. The temperature of the ion-exchange bath and/or time of exposure of different samples of the borosilicate base glass to the ion-exchange bath were varied to achieve different levels of Ag ion-exchange to produce ion-exchanged glasses having different tints. FIG. 1 shows a grayscale depiction of the variation in tint that was achieved by dipping the borosilicate base glass for 30 min into ion-exchange bath maintained at 450° C. Glass 100 includes lower portion 110 and upper portion 105. Upper portion 105 was not dipped into the ion-exchange bath and corresponds to the untreated borosilicate base glass. Lower portion 110 corresponds to the portion dipped into the ion-exchange bath and shows the coloration resulting from treatment of the borosilicate base glass by the silver ion exchange process. Although not evident from the grayscale depiction, upper portion 105 had a green tint and lower portion 110 had a dark brown tint. The depiction shown in FIG. 1 indicates that the silver ion exchange process is capable of imparting brown tint to glass compositions lacking Se.

Figure 2:
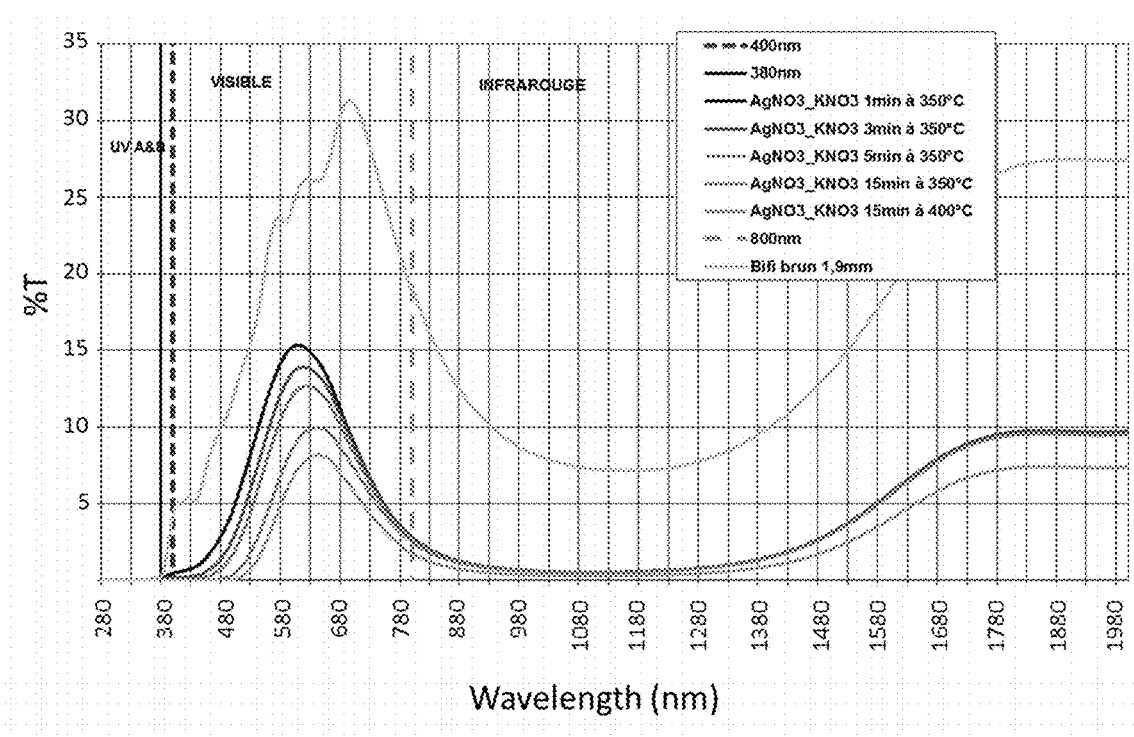
FIG. 2 presents transmission spectra of a reference brown glass made from a melt process and a series of glasses obtained by treating a borosilicate base glass with an ion-exchange process.

FIG. 2 shows the transmission spectra of 1.9 mm thick samples of the borosilicate base glass after treatment in an ion-exchange bath containing 10% $AgNO_3$ and 90% $KNO_3$ at the conditions indicated in the legend. Vertical reference lines at 380 nm, 400 nm, and 800 nm are included in the plot. The uppermost spectrum corresponds to a commercial brown glass made by a bulk melting process that is marketed for good UV and IR absorption performance. The commercial brown glass includes selenium oxide as a colorant to provide the brown tint. The remaining spectra correspond respectively, in descending order of peak visible intensity, to samples of the borosilicate base glass treated in the ion-exchange bath under the conditions (a) 1 min, 350° C., (b) 3 min, 350° C., (c) 5 min, 350° C., (d) 15 min, 350° C., and (e) 15 min, 400° C. The data indicate that the ion-exchanged glasses provide far superior absorption in the UV and IR than the conventional commercial brown glass.

Table 5 summarizes properties of ion-exchanged glasses with thickness 1.9 mm obtained by treating different samples of the borosilicate base glass for different times and temperatures in the ion-exchange bath. Data for five Samples (A-E) are shown. The data indicate an ability to achieve a wide range of chromaticity coordinates for the ion-exchanged glass through variations in the conditions used in the ion exchange process.

TABLE 5

Selected Properties of Ion-Exchanged Glasses

| | Example | | | | |
|---|---|---|---|---|---|
| | A | B | C | D | E |
| AgNO$_3$ Concentration in Ion-exchange Bath (wt %) | 10 | 10 | 10 | 10 | 10 |
| Temperature of Ion-exchange Bath (° C.) | 350 | 350 | 350 | 350 | 450 |
| Time in Ion-exchange Bath (min) | 1 | 3 | 5 | 15 | 15 |
| % T | 10.8 | 8.9 | 7.4 | 4.6 | 3.1 |
| x | 0.4628 | 0.4943 | 0.5143 | 0.5563 | 0.5820 |
| y | 0.4538 | 0.4585 | 0.4574 | 0.4368 | 0.4156 |
| % T (280 nm-400 nm) | 0.034 | 0.017 | 0.008 | 0.002 | 0.002 |
| % T (1100 nm) | 0.52 | 0.52 | 0.50 | 0.49 | 0.28 |
| % T (780 nm-2000 nm) | 1.8 | 1.9 | 1.8 | 1.7 | 1.2 |

In a second series of post-fabrication treatments, samples of the borosilicate base glass were treated by an ion-exchange process in which the samples were immersed for in an ion-exchange bath that included 1 wt % AgNO$_3$, 98.5 wt % KNO$_3$, and 0.5 wt % silicic acid. The temperature of the ion-exchange bath was 350° C. and the time of exposure of different samples of the base glass to the ion-exchange bath was varied to achieve different levels of Ag ion-exchange to produce ion-exchanged glasses with different tints. Tabl6 5 summarizes properties of ion-exchanged glasses with thickness 1.9 mm obtained by treating different samples of the borosilicate base glass for different times and temperatures in the ion-exchange bath. Data for four Samples (F-I) are shown. The data indicate an ability to achieve a wide range of chromaticity coordinates for the ion-exchanged glass through variations in the conditions used in the ion exchange process.

TABLE 6

Selected Properties of Ion-Exchanged Glasses

| | Example | | | |
|---|---|---|---|---|
| | F | G | H | I |
| AgNO$_3$ Concentration in Ion-exchange Bath (wt %) | 1 | 1 | 1 | 1 |
| Temperature of Ion-exchange Bath (° C.) | 350 | 350 | 350 | 350 |
| Time in Ion-exchange Bath (min) | 2 | 5 | 15 | 30 |
| % T | 16.0 | 13.3 | 9.2 | 7.5 |
| x | 0.4316 | 0.4675 | 0.5136 | 0.5294 |
| y | 0.4554 | 0.4698 | 0.4688 | 0.4596 |
| % T (280 nm-400 nm) | 0.075 | 0.030 | 0.002 | 0.001 |
| % T (1100 nm) | 0.52 | 0.52 | 0.53 | 0.51 |
| % T (780 nm-2000 nm) | 1.9 | 1.8 | 1.9 | 1.8 |

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the illustrated embodiments. Since modifications, combinations, sub-combinations and variations of the disclosed embodiments that incorporate the spirit and substance of the illustrated embodiments may occur to persons skilled in the art, the description should be construed to include everything within the scope of the appended claims and their equivalents.

What is claimed is:

1. A glass comprising B$_2$O$_3$, SiO$_2$, and Fe, said Fe including ferric ion (Fe$^{3+}$) and ferrous ion (Fe$^{2+}$), said glass lacking Se and having (i) a tint with a chromaticity coordinate x in the range from 0.37-0.65, and (ii) a concentration of said ferrous ion (Fe$^{2+}$) sufficient to provide an average percent transmittance (% T) over the wavelength range from 780 nm-2000 nm, for a thickness of 1.9 mm, of less than 3%.

2. The glass of claim 1, wherein said glass includes 64 wt %-71 wt % SiO$_2$.

3. The glass of claim 2, wherein said glass further includes 2 wt %-8 wt % B$_2$O$_3$.

4. The glass of claim 3, wherein said glass further includes 6 wt %-10 wt % Na$_2$O and 7 wt %-16 wt % K$_2$O.

5. The glass of claim 1, wherein said glass further includes Fe$_2$O$_3$.

6. The glass of claim 5, wherein said the concentration of said Fe$_2$O$_3$ is in the range from 3 wt %-9 wt %.

7. The glass of claim 6, wherein said glass further includes 64 wt %-71 wt % SiO$_2$ and 2 wt %-8 wt % B$_2$O$_3$.

8. The glass of claim 1, wherein said glass has a tint with a chromaticity coordinate y in the range from 0.37-0.52.

9. The glass of claim 1, wherein said glass has a tint with a chromaticity coordinate x in the range from 0.40-0.62.

10. The glass of claim 1, wherein said glass has an average percent transmittance (% T) over the wavelength range from 780 nm-2000 nm, for a thickness of 1.9 mm, of less than 1%.

11. The glass of claim 10, wherein said glass has an average percent transmittance (% T) over the wavelength range from 280 nm-400 nm, for a thickness of 1.9 mm, of less than 1%.

12. The glass of claim 1, further comprising silver.

13. The glass of claim 12, wherein said silver is present in said glass in the form of metallic particles.

14. The glass of claim 12, wherein said silver is contained in an ion-exchange layer extending from a surface of said glass into said glass.

15. The glass of claim 14, wherein said silver has a non-uniform concentration profile in said ion-exchange layer.

16. The glass of claim 15, wherein said non-uniform concentration profile includes a maximum concentration of silver at said surface of said glass and a continuously decreasing concentration of silver in said glass with increasing distance from said surface.

17. The glass of claim 16, wherein said maximum concentration of silver, as measured by depth profiling and expressed as weight percent of silver oxide, is at least 1.0 wt %.

18. The glass of claim 16, wherein said maximum concentration of silver, as measured by depth profiling and expressed as weight percent of silver oxide, is at least 4.0 wt %.

19. The glass of claim 16, wherein a concentration of silver at a depth of 1 μm from said surface is in the range from 10% to 90% of said maximum concentration.

20. The glass of claim 19, wherein a concentration of silver at a depth of 5 μm from said surface is less than said concentration of silver at a depth of 1 μm from said surface and said concentration of silver at a depth of 5 μm from said surface is in the range from 5% to 90% of said maximum concentration.

21. The glass of claim 20, wherein a concentration of silver at a depth of 10 μm from said surface is less than said concentration of silver at a depth of 5 μm from said surface and said concentration of silver at a depth of 10 μm from said surface is in the range from 10% to 85% of said maximum concentration.

* * * * *